United States Patent
Takesue et al.

(10) Patent No.: US 7,483,368 B2
(45) Date of Patent: Jan. 27, 2009

(54) METHOD AND DETECTING CARRIER SHIFT AMOUNT IN DIGITAL TRANSMISSION SIGNAL, METHOD OF CORRECTING CARRIER SHIFT AMOUNT, AND RECEIVER EMPLOYING THESE METHODS

(75) Inventors: Hiroyuki Takesue, Hachioji (JP); Tatsuhiro Nakada, Akishima (JP); Nobuo Tsukamoto, Akishima (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 876 days.

(21) Appl. No.: 10/941,964

(22) Filed: Sep. 16, 2004

(65) Prior Publication Data

US 2005/0094739 A1 May 5, 2005

(30) Foreign Application Priority Data

Sep. 30, 2003 (JP) ............................. 2003-340266

(51) Int. Cl.
*H04J 11/00* (2006.01)
*H04J 3/06* (2006.01)

(52) U.S. Cl. ..................................... 370/208; 370/516
(58) Field of Classification Search ................. 370/208, 370/516
See application file for complete search history.

(56) References Cited

U.S. PATENT DOCUMENTS 5,946,292 A * 8/1999 Tsujishita et al. ........... 370/204
6,618,450 B1 * 9/2003 Hatta ........................ 375/340
6,788,654 B1 * 9/2004 Hashimoto et al. .......... 370/321
6,947,512 B1 * 9/2005 Shinoda et al. ............. 375/371
6,965,650 B2 * 11/2005 Akiyama et al. ............ 375/261
6,983,027 B2 * 1/2006 Seki et al. .................. 375/316
7,149,266 B1 * 12/2006 Imamura et al. ............ 375/355
2001/0043657 A1 * 11/2001 Yamauchi .................. 375/324
2002/0145971 A1 * 10/2002 Cho et al. ................... 370/208
2007/0053457 A1 * 3/2007 Sakoda ...................... 375/260

FOREIGN PATENT DOCUMENTS

JP 11-4209 1/1999

OTHER PUBLICATIONS

"Portable OFDM Type Radio Transmission System For Transmitting Television Broadcast Program Material", ARB-STD-B33, pp. 35-41, Mar. 28, 2002.

* cited by examiner

*Primary Examiner*—Andrew Lee
(74) *Attorney, Agent, or Firm*—Mattingly, Stanger, Malur & Brundidge, P.C.

(57) ABSTRACT

A TMCC carrier is demodulated from a received OFDM signal having a TMCC carrier. A relative carrier position of the demodulated TMCC carrier is detected. A carrier shift amount is detected from the detected relative carrier position of the TMCC carrier and a normal TMCC carrier position. The received OFDM signal is corrected for the carrier frequency shift based on the detected carrier shift amount.

8 Claims, 6 Drawing Sheets

LAYOUT OF 1K FULL-MODE TMCC, AC, Null CARRIERS

| CARRIER | QUANTITY | CARRIER NUMBER |
|---|---|---|
| TMCC | 10 | 50 157 220 314 356 470 597 628 707 798 |
| AC | 66 | 1 2 3 4 5 6 7 9 10 11 12 13 20 37 63 87 111 122 148 155 174 191 211 227 249 267 293 310 327 348 373 379 402 421 454 458 482 493 529 534 567 586 601 620 631 647 681 699 717 721 742 759 790 825 843 844 845 846 847 849 850 851 852 853 854 855 |
| Null | 1 | 428 |

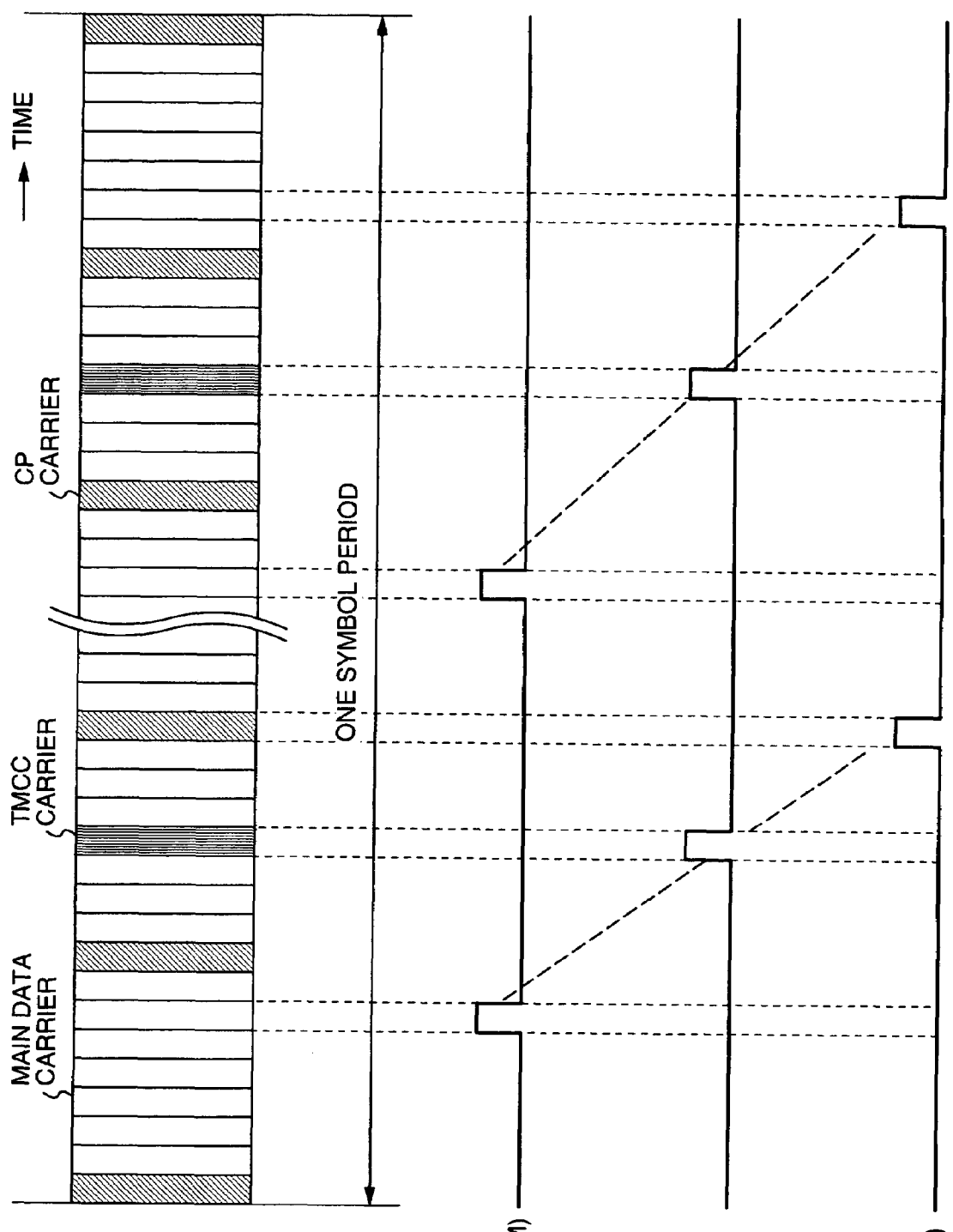

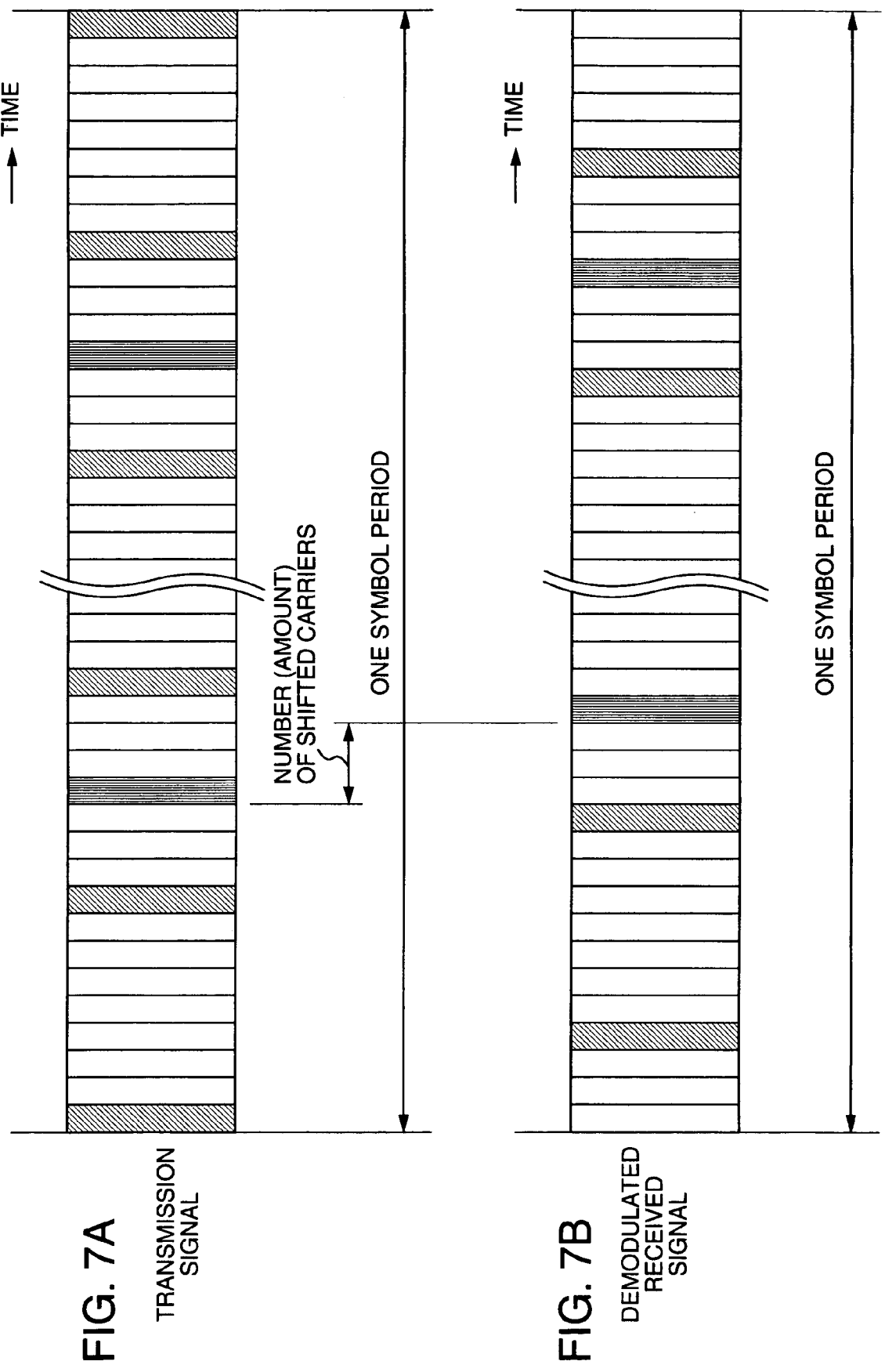

METHOD AND DETECTING CARRIER SHIFT AMOUNT IN DIGITAL TRANSMISSION SIGNAL, METHOD OF CORRECTING CARRIER SHIFT AMOUNT, AND RECEIVER EMPLOYING THESE METHODS

BACKGROUND OF THE INVENTION

The present invention relates to improvements on immunity of a digital transmitter in transmission, and more particularly, to a method of detecting a carrier shift amount, a method of correcting the carrier shift amount, and a receiver employing these methods.

In recent years, an orthogonal frequency division multiplex (hereinafter, abbreviated as "OFDM") modulation scheme, which is characterized by immunity to multipath fading and ghost, has gain the spotlight because of its suitability to applications in mobile digital transmission and ground-based digital television broadcasting.

The OFDM scheme, which is one of multi-carrier modulation schemes, digitally modulates n carriers (n ranges from several tens to several hundreds) which are orthogonal to one another.

A transmission signal from a transmitter in such a digital communication system can suffer from shifts in frequency on a transmission path due to influences such as fading. When a frequency-shifted signal is received, the signal must be corrected for the frequency shift before it is demodulated.

FIG. 1 illustrates a prior art example for correcting a received signal for a frequency shift. A signal received at a high frequency reception unit (not shown) of a receiver is frequency converted to an IF signal in the high frequency reception unit. The IF signal from the high frequency reception unit is again frequency converted to a baseband signal in a frequency converter 1. The resulting baseband signal, after converted from the received signal, is analog-to-digital converted in an AD (analog-to-digital) converter 3 (hereinafter called the "A/D conversion"). The digital signal resulting from the A/D conversion is orthogonally demodulated to an I-axis and Q-axis signal in an orthogonal demodulator 4. The Q-axis signal resulting from the orthogonal demodulation is applied to an error detector 8 to control a control voltage of a frequency control VCO (voltage controlled oscillator) 2 such that the value of the Q-axis signal reduces to zero. With this control, the frequency shift exerted on the signal in the midway of a transmission path is removed from the received signal. Such techniques are disclosed, for example, in JP-A-11-4209.

SUMMARY OF THE INVENTION

However, the foregoing control method for correcting a signal for a frequency shift implies the following problems. The foregoing control method cannot normally correct for a frequency shift unless the amount of frequency shift is within certain limits. An OFDM transmission signal has a multi-carrier structure as illustrated in FIG. 2. Specifically, when the frequency shifts by two or more carriers in the positive or negative phase direction (here, such a scenario is defined a "±2 carrier shift" for convenience), the control method takes corrective actions to align the phase to the carrier closest to a reference point at which the carrier position has shifted. Therefore, the control method has a problem in that it fails to align the carrier to a correct position if a frequency shift extends across two or more carriers though it successfully aligns the carrier to the correct position if a frequency shift extends over one carrier or less.

As described above, a problem experienced by the prior art control method described above is that the frequency can be normally corrected for a shift if the shift extends over ±1 carrier or less, whereas the frequency cannot be normally corrected for a shift if the shift extends over ±2 carriers or more.

It is an object of the present invention to eliminate the foregoing disadvantages and to enable a received signal to be corrected for a frequency shift even when the frequency shift extends across ±2 carriers or more.

To achieve the above object, in a transmission system for transmitting an OFDM signal having a TMCC (Transmission and Multiplexing Configuration Control)carrier, the present invention demodulates the TMCC carrier from a received signal, detects a relative carrier position of the demodulated TMCC carrier, and detects a carrier shift amount based on the detected TMCC carrier position.

The present invention also detects the carrier shift amount from the detected relative carrier position of the TMCC carrier and a normal TMCC carrier position, and corrects the received signal for a carrier frequency shift based on the detected carrier shift amount.

For detecting the relative carrier position of the TMCC carrier, all TMCC carrier data are added within one symbol period of the demodulated signal in a range of ±M carriers (M is an integer equal to or larger than two) from the normal TMCC carrier position.

The added signals are further added for N symbols (N is an integer equal to or larger than two), a peak position is detected from a signal resulting from the addition for the N symbols, and the carrier shift amount is detected from the detected peak position and normal TMCC carrier position.

According to the present invention, a received signal can be normally corrected for a frequency shift suffered on a transmission path or the like, even if the frequency shift extends over ±2carriers, thus improving immunity in the transmission.

Other objects, features and advantages of the invention will become apparent from the following description of the embodiments of the invention taken in conjunction with the accompanying drawings.

BRIEF DESCRIPTION OF THE DRAWINGS

FIGS. 6A to 6D are timing charts for describing the operation of the TMCC carrier position detector; and FIGS. 7A and 7B are schematic diagrams for describing a TMCC carrier demodulated position when there is a shift of ±2 carriers or more.

DETAILED DESCRIPTION OF THE EMBODIMENT

The present invention can be applied to a transmission system for transmitting a transmission signal which has main data carriers for sending main data, and sub-data carriers placed at random positions for sending sub-data. The main data used herein refers to such data as audio, video, and the like, and the sub-data refers to auxiliary data other than the main data, including, for example, mode identification data for modulation schemes and the like.

An example of such a transmission signal may be an OFDM transmission signal.

The following embodiment will be described in connection with an OFDM transmitter to which the present invention is applied.

Figure 1:
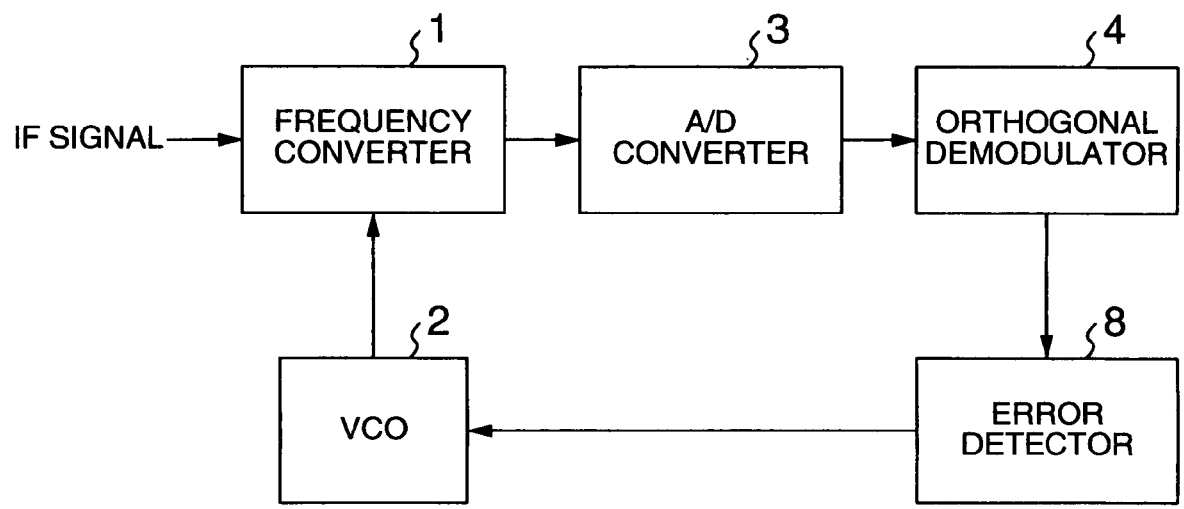
FIG. 1 is a block diagram illustrating an exemplary configuration of a conventional receiver for receiving an OFDM transmission signal.
Figure 2:
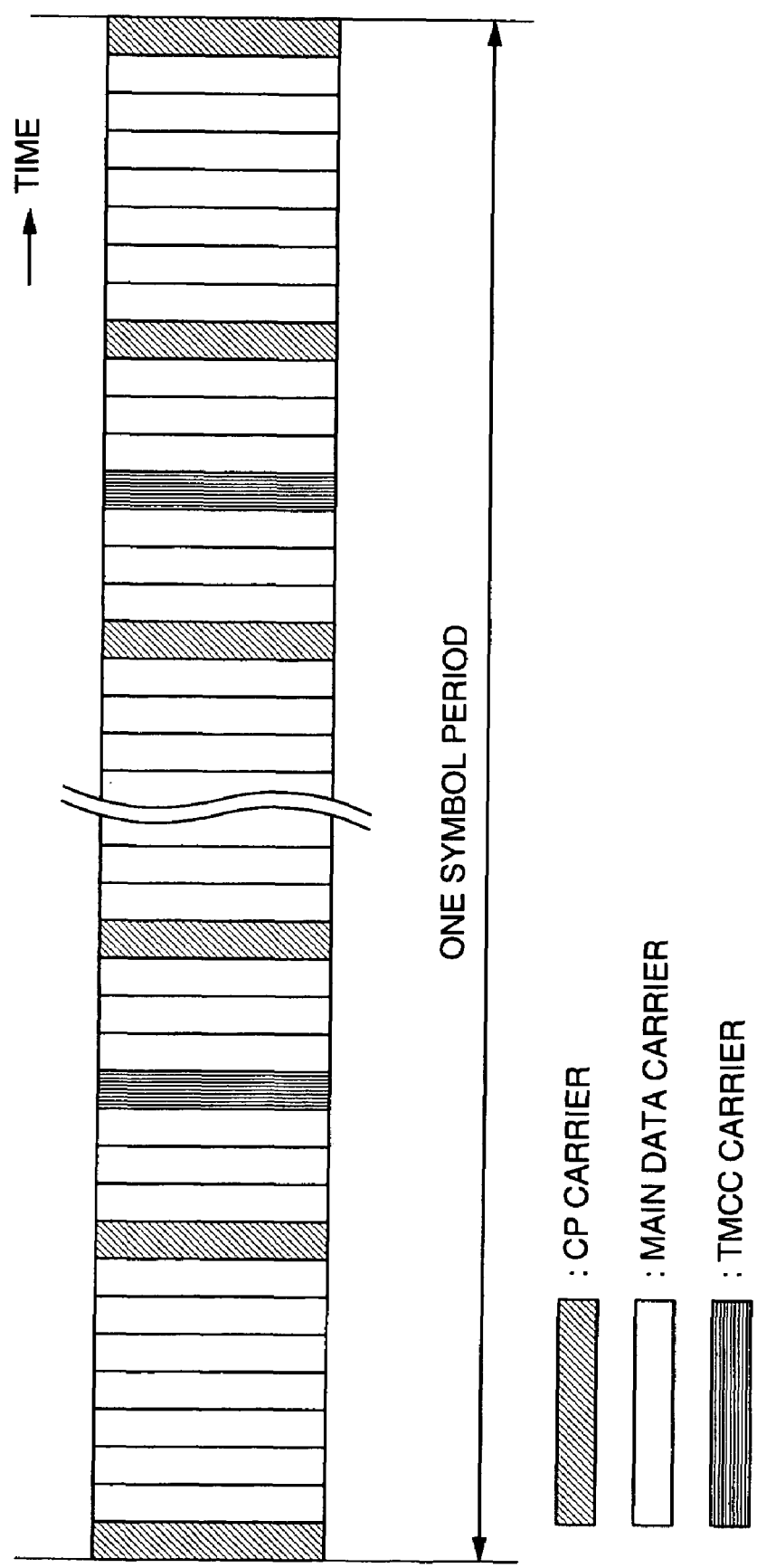
FIG. 2 is a schematic diagram illustrating the layout of carriers of an OFDM transmission signal.

Before describing the present invention, a review will be made on the layout of carriers for use by the OFDM transmitter. As illustrated in FIG. 2, an OFDM transmission signal has a multi-carrier structure. Carriers are classified into a main data carrier for sending main data, and sub-data carriers placed at predetermined random positions for sending sub-data. The sub-data carriers include, for example, a PC (Continual Pilot) carrier placed on a periodic basis (for example, every eighth carrier); a TMCC (Transmission and Multiplexing Configuration Control) carrier placed at a predetermined random position; an AC (Auxiliary Channel) carrier placed at a predetermined random position, an AC (Auxiliary Channel) carrier placed at a predetermined random position, and a Null (Null) carrier placed on a periodic basis (for example, every 420 carriers). Carriers other than those are main data carriers. It should be noted that the AC carrier and Null carrier are omitted in FIG. 2.

Here, the CP carrier is used for restoring the synchronization; the TMCC carrier for identifying a mode of a modulation scheme or the like; and the main data carrier for transmitting video and audio contents.

Figures 3, 5:
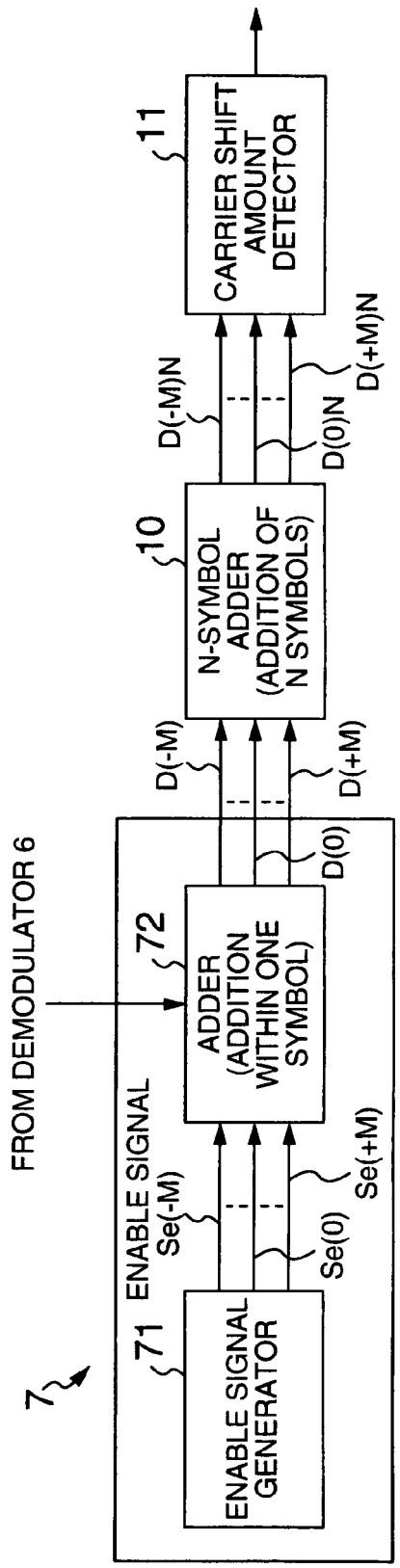
FIG. 3 is a table showing the layout of sub-data carriers in a 2K half mode.
FIG. 5 is a block diagram illustrating the configuration of a TMCC carrier position detector and the like in the receiver of FIG. 4.

FIG. 3 is a table showing the layout of the sub-data carriers in a 2K half mode within those carriers which conform to a standard referred to as "ARIB STD-B33." The CP carrier is omitted in FIG. 3.

The following description on the embodiment will be made in connection with an example in which the 2K half mode is used.

Figure 4:
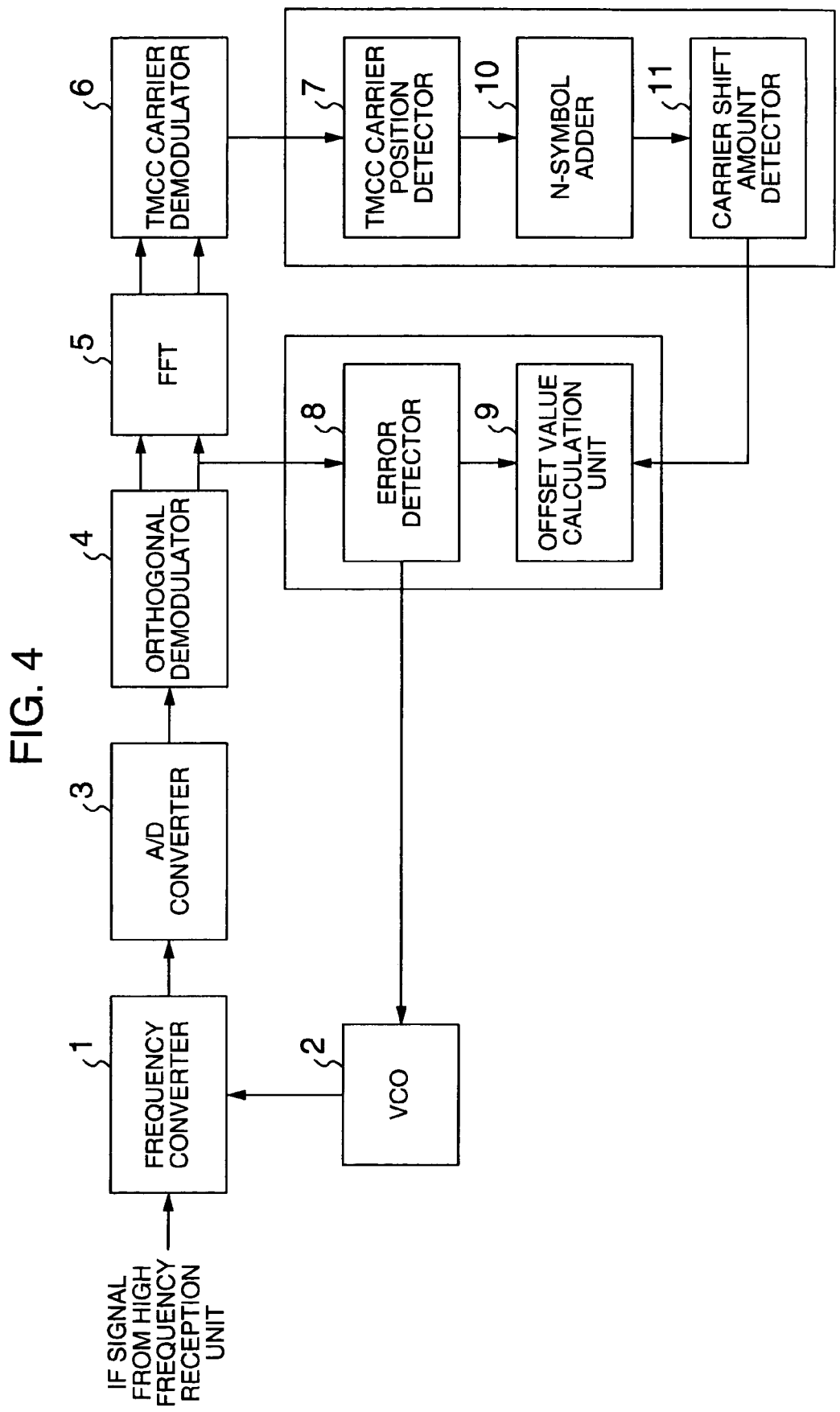
FIG. 4 is a block diagram illustrating the configuration of a receiver for receiving an OFDM transmission signal according to one embodiment of the present invention.

Now, a method of detecting the number of shifted carriers (shift amount), and a method of correcting for a frequency shift according to one embodiment of the present invention will be described in detail with reference to FIG. 4 onward.

A signa received at a high frequency reception unit (not shown) of a receiver is frequency converted to an IF signal in the high frequency reception unit. The IF signal from the high frequency reception unit is again frequency converted to a baseband signal in a frequency converter 1. The baseband signal resulting from the frequency conversion is A/D converted by an AD converter 3. A digital signal resulting from the A/D conversion is orthogonally demodulated to an I-axis signal and a Q-axis signal in an orthogonal demodulator 4. The I-axis and Q-axis signals resulting from the orthogonal demodulation are applied to a FFT (First Fourier Transform) unit for Fourier transform. The Fourier transformed I-axis and Q-axis signals are applied to a TMCC carrier demodulator 6 which differentially demodulates all TMCC carrier data (in the present invention, for example, a DQPSK (Differential Quadrature Phase Shift Keying) demodulation is employed).

The differentially demodulated received signal (called herein the "TMCC carrier demodulated signal") is applied to a TMCC carrier position detector 7. The TMCC carrier position detector 7 adds all values of the demodulated data within one symbol period which were sampled in a predetermined random positioning pattern of TMCC carriers, as will be later described in greater detail. In this event, the foregoing addition is performed for each of the positioning patterns which shift in increments of one carrier within ±M carriers (for example, M=20) from the position of a normal TMCC carrier.

Assume that for a transmission signal in a 7 GHz or a 10 GHz band with a carrier interval of 20 kHz, the value of M is chosen to be 20 when the frequency deviation is specified to be 7 PPM. However, in the present invention, the value of M is not limited to the foregoing value.

Here, an exemplary specific configuration will be shown in FIG. 5 for the TMCC carrier position detector 7, and N-symbol adder 10, a carrier shift amount detector 11, and the operation of these components will be described with reference to FIGS. 6A to 6D. Alternatively, the processing of these components 7, 10, 11 may be executed by a computer in software.

The TMCC carrier position detector 7 comprises an enable signal generator 71 and an adder 72. The enable signal generator 71 generates an enable signal Se corresponding to a predetermined random positioning pattern (see FIG. 3) of the TMCC carrier. Here, the enable signal generator 71 generates 2M+1 enable signals Se(−M)-Se(0)-Se(+M). In other words, these enable signals Se(−M)-Se(0)-Se(+M) are pulse signals synchronized to the predetermined random positions of the TMCC carriers, and each shifted in phase by one carrier position with reference to the enable signal Se(0). Thus, an enable signal Se(−M) delays in phase by M carriers from the enable signal Se(0), while an enable signal Se(+M) advances in phase by M carriers from the enable signal Se(0).

It should be noted that the enable signal Se(0) is illustrated to be in synchronism with a TMCC carrier of a differentially demodulated signal (FIG. 6A) from the demodulator 6, but the enable signal Se(0) may be in synchronism with any carrier.

The adder 72 samples the differentially demodulated received signal (TMCC carrier demodulated signal) from the demodulator 6 on a symbol-by-symbol basis in synchronism with the pulse of each enable signal Se(−M)-Se(0)-Se(+M), adds the resulting samples, and outputs the sum value D(−M)-D(0)-D(+M) for one symbol to the N-symbol adder 10. Specifically, the adder 72 samples one symbol of the differentially demodulated signal from the demodulator 6, for example, in synchronism with the pulse of the enable signal Se(0), adds the resulting samples, and outputs the sum value D(0). This one symbol of the sum signal D(0) is outputted on a symbol-by-symbol basis. The other sum values are derived and outputted on a symbol-by-symbol basis in a similar manner.

The N-symbol adder 10 adds N symbols (for example, N=10) of each of sum values D(−M)-D(0)-D(+M) for each symbol to find sum values D(−M)N-D(0)N-D(+M)N which are applied to the carrier shift amount detector 11. Specifically, the N-symbol adder 10 adds N symbols of the sum value D(0) for each symbol to output the sum value D(0)N. The other sum values D(−M)N-D(+M)N are found and applied to the carrier shift amount detector 11 in a similar manner.

Here, the value of N is determined in the following manner. That is, the value of N is decided depending on, to which degree of C/N (carrier to noise ratio), the carrier shift amount of the transmission signal is to be determined. When the value of N is set larger, the carrier shift amount of the transmission signal can be determined as to the transmission signal of a lower degree of C/N. However, in this case, it takes a longer time to determine the carrier shift amount. For example, when the lowest value of C/N is set to −1 (dB), N is about 50. In this case, since one symbol length is about 50 µs, the period of N symbols becomes about 2.5 ms. In this manner, when the carrier shift amount of the transmission signal may be determined as to the transmission signal of a higher degree of C/N, the number of N may be set to a small value. In contrast, when the carrier shift amount of the transmission signal may be determined as to the transmission signal of a lower degree of C/N, the number of N may be set to a large value.

The carrier shift amount detector 11 detects the largest value (peak value) of these sum values D(−M)N-D(0)N-D(+M)N, and detects a carrier position corresponding to the detected largest value. Specifically, the carrier shift amount detector 11 determines that the largest value (peak value) of the sum values D(−M)N-D(0)N-D(+M)N is generated by sampling of a TMCC carrier, and that the largest value is at the actual TMCC carrier position. For example, when the largest value (peak value) is D(+M)N, the carrier shift amount detector 11 determines that the TMCC carrier exists at a position B in FIG. 6. This is because the sum of sampling data added at a position shifted further away in phase from the actual TMCC carrier position approaches more to zero, as compared with the sum of sampling data added at the actual TMCC carrier position.

Thus, as illustrated in FIGS. 7A, 7B, even if there is a shift of ±2 carriers or more, the peak value, i.e., the actual TMCC carrier position of a received signal (FIG. 7B) is detected at a position shifted from a TMCC carrier position of a transmission signal (FIG. 7A) (i.e., at a normal TMCC carrier position or a TMCC carrier position free from a frequency shift). The TMCC carrier position of the transmission signal is determined at the predetermined positions in advance. Thus, the TMCC carrier positioned can be recognized at the predetermined positions so long as there is no carrier shift amount.

Bearing the foregoing in mind, the carrier shift amount detector 11 detects the difference between a carrier position determined to be the actual TMCC carrier position and the normal TMCC carrier position (difference in the number of carriers) as the number of shifted carriers (shift amount).

The number of shifted carriers detected by the carrier shift amount detector 11 is applied to the offset value calculation unit 9 which calculates an offset value for controlling the frequency control VCO 2 in accordance with the detected number of shifted carriers. The calculated offset value is applied to the error detector 8 which adds the offset value to a control voltage value for the VCO 2 to control the control voltage value for the VCO 2.

In this way, even if there is a shift of ±2 carriers or more, it is possible to accurately detect the number of shifted carriers from a carrier shifted position to a normal TMCC carrier position to normally correct a received signal for a frequency shift.

In the foregoing embodiment, the carrier shift amount is continuously detected every N symbols to correct a received signal for a carrier frequency shift, but the carrier shift amount may be detected every N intermittent or discrete symbols to correct a received signal for a carrier frequency shift.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of detecting a carrier shift in a transmission system for transmitting an Orthogonal Frequency Division Multiplex (OFDM) transmission signal having a Transmission and Multiplexing Configuration Control (TMCC) carrier, said method comprising the steps of:
   a) demodulating the TMCC carrier from a received OFDM transmission signal to restore a TMCC carrier demodulated signal;
   b) detecting a relative carrier position of the TMCC carrier demodulated signal; and
   c) detecting a carrier shift amount based on the detected relative carrier position of the TMCC carrier demodulated signal,
   wherein said step b) includes the sub-steps of:
   b1) sampling the TMCC carrier demodulated signal in one symbol period in a predetermined layout pattern of the TMCC carrier, and adding the resulting samples, and
   b2) executing the sub-step b1) in each of positioning patterns shifted in increments of one carrier from the normal TMCC carrier position within a range of ± M carriers (M is an integer equal to or larger than two).

2. A method according to claim 1, wherein:
   said step c) includes detecting the carrier shift amount from the detected relative carrier position of the TMCC carrier and a normal TMCC carrier position,
   whereby the received OFDM transmission signal is corrected for a carrier frequency shift based on the detected carrier shift amount.

3. A method according to claim 1, wherein said step b) further includes the sub-steps of:
   b3) adding the signals added at the sub-step b1) over N symbol periods (N is an integer equal to or larger than two);
   b4) executing the sub-step b3) in each of positioning patterns shifted in increments of one carrier from the normal TMCC carrier position within a range of ± M carriers (M is an integer equal to or larger than two); and
   b5) detecting a maximum of sum values calculated at the sub-step b4) to detect the position of a positioning pattern corresponding to the maximum as said relative carrier position, and
   wherein said step c) includes detecting the carrier shift amount from the detected relative carrier position and the normal TMCC carrier position.

4. A method of detecting a frequency shift of a carrier in a transmission system for transmitting a digital transmission signal having a first carrier for sending main data and a second carrier placed at a predetermined random position for sending sub-data, said method comprising the steps of:
   a) demodulating the second carrier from a received transmission signal to restore a second carrier demodulated signal;
   b) detecting a relative carrier position of the second carrier demodulated signal, and
   c) detecting a carrier shift amount based on the detected relative carrier position of the second carrier demodulated signal,
   wherein said step b) includes the sub-steps of:
   b1) sampling the second carrier demodulated signal in one symbol period in a predetermined layout pattern of the second carrier, and adding the resulting samples; and
   b2) executing the sub-step b1) in each of positioning patterns shifted in increments of one carrier from the normal second carrier position within a range of ± M carriers (M is an integer equal to or larger than two).

5. A method according to claim 4, wherein:
   said step c) includes detecting the carrier shift amount from the detected relative carrier position of the second carrier and a normal second carrier position,
   whereby the received transmission signal is corrected for a carrier frequency shift based on the detected carrier shift amount.

6. A method according to claim 4, wherein said step b) further includes the sub-steps of:

b3) adding the signals added at the sub-step b1) over N symbol periods (N is an integer equal to or larger than two);

b4) executing the sub-step b3) in each of positioning patterns shifted in increments of one carrier from the normal second carrier position within a range of ± M carriers (M is an integer equal to or larger than two);

b5) detecting a maximum of sum values calculated at the sub-step b4) to detect the position of a positioning pattern corresponding to the maximum as said relative carrier position, and wherein said step c) includes detecting the carrier shift amount from the detected relative carrier position and the normal second carrier position.

7. A method according to claim 4, wherein said transmission signal is an Orthogonal Frequency Division Multiplex (OFDM) transmission signal, and wherein said second carrier is a Transmission and Multiplexing Configuration Control (TMCC) carrier.

8. A receiver for receiving an Orthogonal Frequency Division Multiplex (OFDM) transmission signal, comprising:

a frequency converter for frequency converting an Intermediate Frequency (IF) signal from a high frequency reception unit to a baseband signal;

an analog to digital (A/D) converter for converting the baseband signal resulting from the frequency conversion to a digital signal;

an orthogonal demodulator for orthogonally demodulating the digital signal from said A/D converter to an In-Phase (I)-axis signal and a Quadrature-Phase (Q)-axis signal;

A Fast Fourier Transform (FFT) unit for Fourier transforming the I-axis signal and the Q-axis signal resulting from the orthogonal demodulation;

a Transmission and Multiplexing Configuration Control (TMCC) carrier demodulator for differentially demodulating the Fourier transformed I-axis and Q-axis signals to output a TMCC carrier demodulated signal;

a carrier position detector for detecting a relative carrier position of the TMCC carrier demodulated signal;

a carrier shift amount detector for detecting a carrier shift amount based on the detected relative carrier position; and a correction controller for controlling a correction of the OFDM transmission signal for the carrier frequency shift based on the detected carrier shift amount.

* * * * *